US012333486B2

(12) United States Patent
Liu

(10) Patent No.: US 12,333,486 B2
(45) Date of Patent: Jun. 17, 2025

(54) SORTING SYSTEM AND METHOD

(71) Applicant: BEIJING GEEKPLUS TECHNOLOGY CO. LTD., Beijing (CN)

(72) Inventor: Kai Liu, Beijing (CN)

(73) Assignee: BEIJING GEEKPLUS TECHNOLOGY CO. LTD., Beijing (CN)

( * ) Notice: Subject to any disclaimer, the term of this patent is extended or adjusted under 35 U.S.C. 154(b) by 663 days.

(21) Appl. No.: 17/636,660

(22) PCT Filed: Mar. 26, 2020

(86) PCT No.: PCT/CN2020/081270
§ 371 (c)(1),
(2) Date: Jul. 26, 2022

(87) PCT Pub. No.: WO2021/031563
PCT Pub. Date: Feb. 25, 2021

(65) Prior Publication Data
US 2022/0366359 A1    Nov. 17, 2022

(30) Foreign Application Priority Data

Aug. 19, 2019  (CN) .......................... 201910765281.2

(51) Int. Cl.
*G06Q 10/087* (2023.01)
*G06K 7/10* (2006.01)

(52) U.S. Cl.
CPC ....... *G06Q 10/087* (2013.01); *G06K 7/10366* (2013.01)

(58) Field of Classification Search
CPC .............. G06Q 10/087; G06K 7/10366; B07C 2501/0063; B07C 5/36; B07C 5/34; B07C 5/361

(Continued)

(56) References Cited

U.S. PATENT DOCUMENTS

| 2004/0174244 A1 | 9/2004 | Eidemiller |
| 2013/0134075 A1 | 5/2013 | Berdelle-Hilge |
| 2018/0169858 A1* | 6/2018 | Jain ...................... B65G 1/1375 |

FOREIGN PATENT DOCUMENTS

| CN | 102568044 | 7/2012 |
| CN | 104571110 | 4/2015 |

(Continued)

OTHER PUBLICATIONS

Fernández-Caramés, Tiago M et al. Towards an Autonomous Industry 4.0 Warehouse: A UAV and Blockchain-Based System for Inventory and Traceability Applications in Big Data-Driven Supply Chain Management. Sensors; Basel vol. 19, Iss. 10, (Feb. 2019). (Year: 2019).*

(Continued)

*Primary Examiner* — Florian M Zeender
*Assistant Examiner* — Fawaad Haider
(74) *Attorney, Agent, or Firm* — Hodgson Russ LLP

(57) ABSTRACT

A sorting system includes a first frequency tag reader, a control server, at least one sorting robot, at least one feeding table and at least one collection container. The feeding table is configured to place at least one item to be sorted each provided with a radio frequency tag. Tag information of each radio frequency tag includes sorting destination information. The first radio frequency tag reader is configured to read tag information, and send the tag information to the control server. The control server is configured to determine sorting destination information of the item to be sorted according to the tag information, determine a target collection container according to the sorting destination information, and send a delivery instruction to the sorting robot. The sorting robot is configured to, in response to the delivery instruction, deliver the item to be sorted to the target collection container.

19 Claims, 4 Drawing Sheets

(58) Field of Classification Search
USPC .......................................................... 705/28
See application file for complete search history.

(56) References Cited

FOREIGN PATENT DOCUMENTS

| CN | 104574021 | 4/2015 | | |
|---|---|---|---|---|
| CN | 105057219 | 11/2015 | | |
| CN | 105184393 | 12/2015 | | |
| CN | 106391485 | 2/2017 | | |
| CN | 108698089 | 10/2018 | | |
| CN | 108714569 | 10/2018 | | |
| CN | 109351643 | 2/2019 | | |
| CN | 208494999 | 2/2019 | | |
| CN | 109414729 | 3/2019 | | |
| CN | 109550697 | 4/2019 | | |
| CN | 109807068 | 5/2019 | | |
| CN | 109987369 | 7/2019 | | |
| CN | 110340034 | 10/2019 | | |
| DE | 102007038837 | A1 * | 2/2009 | ............... B07C 5/36 |
| KR | 20090041054 | | 4/2009 | |
| WO | WO-2019036346 | A1 * | 2/2019 | ............. B07C 3/008 |
| WO | 2019061847 | A1 | 4/2019 | |

OTHER PUBLICATIONS

WIPO, International Search Report for International Application No. PCT/CN2020/081270, Jul. 2, 2020.

CNIPA, First Office Action for CN Application No. 201910765281. 2, Aug. 17, 2020.

CNIPA, Notification to Grant Patent Right for Invention for CN Application No. 201910765281.2, Nov. 5, 2020.

EPO, Partial Supplementary European Search Report for EP Application No. 20854880.0, Jul. 15, 2022.

* cited by examiner

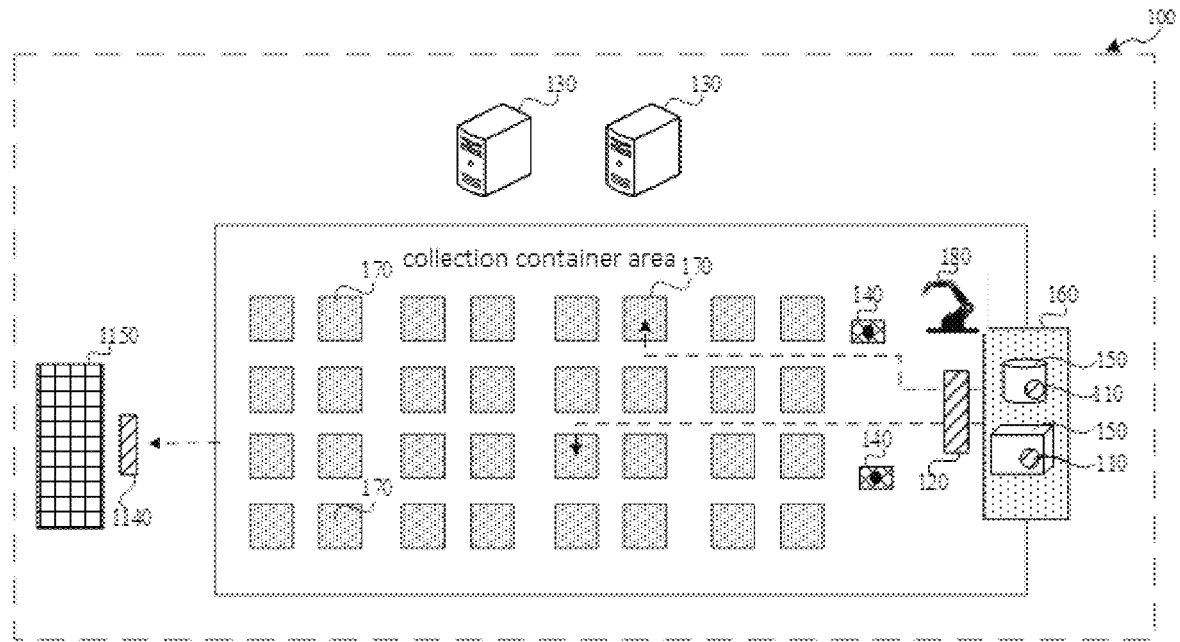

FIG. 7

| the first radio frequency tag reader reads the tag information of each radio frequency tag in at least one radio frequency tag, and sends the read tag information to the control server. The at least one radio frequency tag is respectively configured on at least one item to be sorted placed on at least one feeding table, and the tag information of each radio frequency tag includes sorting destination information of the item to be sorted where each radio frequency tag is located | S810 |

↓

| the control server determines the sorting destination of the item to be sorted where each radio frequency tag is located according to the tag information read by the first radio frequency tag reader, and determine a target collection container from at least one collection container according to the sorting destination, and sends a delivery instruction to at least one sorting robot. | S820 |

↓

| in response to the delivery instruction, the at least one sorting robot delivers at least one item to be sorted where each radio frequency tag is located, obtained from the at least one feeding table, to the target collection container | S830 |

FIG. 8

SORTING SYSTEM AND METHOD

CROSS-REFERENCE TO RELATED APPLICATIONS

This application is the U.S. national phase entry of International Application No. PCT/CN2020/081270, filed on Mar. 26, 2020, which claims priority to Chinese Patent Application No. 201910765281.2, filed on Aug. 19, 2019, the entire disclosures of which are incorporated herein by reference.

TECHNICAL FIELD

The present disclosure relates to a field of logistics and warehousing technologies, and particularly to a sorting system and method.

BACKGROUND

In the warehousing and logistics industry, sorting of commodities or packages is a very important link in the warehousing and logistics industry. Through the sorting, commodities or packages with different destinations can be collected and distributed, so as to achieve unified collection, storage and transportation of commodities or packages of the same destination.

At present, in the sorting process, a manual hand-held barcode identification device is pointed at the barcode of the commodity or package to identify the barcode of the commodity or package. However, with the sharp increase in the number and types of the commodities or packages, the task of the sorting operation is getting heavier and heavier, and the proportion of the sorting operation in the warehousing and logistics industry is increasing. If the traditional method is used, it will not only greatly increase the labor cost, but also cause incorrect identification problems due to such as barcode wrinkles, which will seriously affect the sorting efficiency.

SUMMARY

Embodiments of the present disclosure provide a sorting system, including a first radio frequency tag reader, a control server, at least one sorting robot, at least one feeding table and at least one collection container, wherein, the feeding table is configured to place at least one item to be sorted; the item to be sorted is provided with a radio frequency tag, and tag information of each radio frequency tag comprises sorting destination information of the item to be sorted;
  the first radio frequency tag reader is configured to read tag information in a radio frequency tag, and send the read tag information to the control server;
  the control server is configured to determine a sorting destination of the item to be sorted according to the read tag information comprising the sorting destination information, determine a target collection container corresponding to the item to be sorted from the at least one collection container according to the sorting destination, and send a delivery instruction to a sorting robot;
  the sorting robot is configured to, in response to the delivery instruction received from the control server, deliver the item to be sorted to the target collection container.

Embodiments of the present disclosure further provide a sorting method, including:
  reading, by a first radio frequency tag reader, tag information of at least one radio frequency tag, and sending the read tag information to a control server, wherein the at least one radio frequency tag is respectively configured on at least one item to be sorted placed on at least one feeding table, the tag information of each radio frequency tag comprises sorting destination information of the item to be sorted where each radio frequency tag is located;
  determining, by the control server, a sorting destination of the item to be sorted where each radio frequency tag is located according to the tag information read by the first radio frequency tag reader comprising the sorting destination information, determining a target collection container from at least one collection container according to the sorting destination, and sending a delivery instruction to at least one sorting robot;
  in response to the delivery instruction, delivering, by the at least one sorting robot, each item to be sorted to a corresponding target collection container.

BRIEF DESCRIPTION OF THE DRAWINGS

The drawings are for the purpose of illustrating alternative embodiments only and are not to be considered as limitation to the present disclosure. Also, the same components are denoted by the same reference numerals throughout the drawings. In the attached drawings:

FIG. 7 is a schematic diagram of another sorting system provided in an embodiment of the present disclosure.

FIG. 8 is a flowchart of a sorting method provided in an embodiment of the present disclosure.

DETAILED DESCRIPTION

The present application will be described below with reference to the accompanying drawings and embodiments. It should be understood that the specific embodiments described herein are only used to explain the present application, but not to limit the present application. In addition, it should be noted that, for the convenience of description, the drawings only show some but not all the structures related to the present application.

The following briefly introduces the overall sorting process of items to be sorted (for example, commodities or packages to be sorted) in embodiments. The overall sorting process includes three links: a feeding link, a delivery link, and a collection link. In embodiments, the feeding link realizes that the items to be sorted are distributed from the transport equipment to feeding tables; the delivery link realizes that the items to be sorted on the feeding tables are delivered to collection containers deployed in the delivery area; the collection link realizes transfer of the collection containers containing the items to be sorted to collection tables, and the sorting process of the items to be sorted can be completed after the above three links.

A sorting system and method provided in embodiments of the present disclosure are described below through the following embodiments and their optional solutions.

Figure 1:
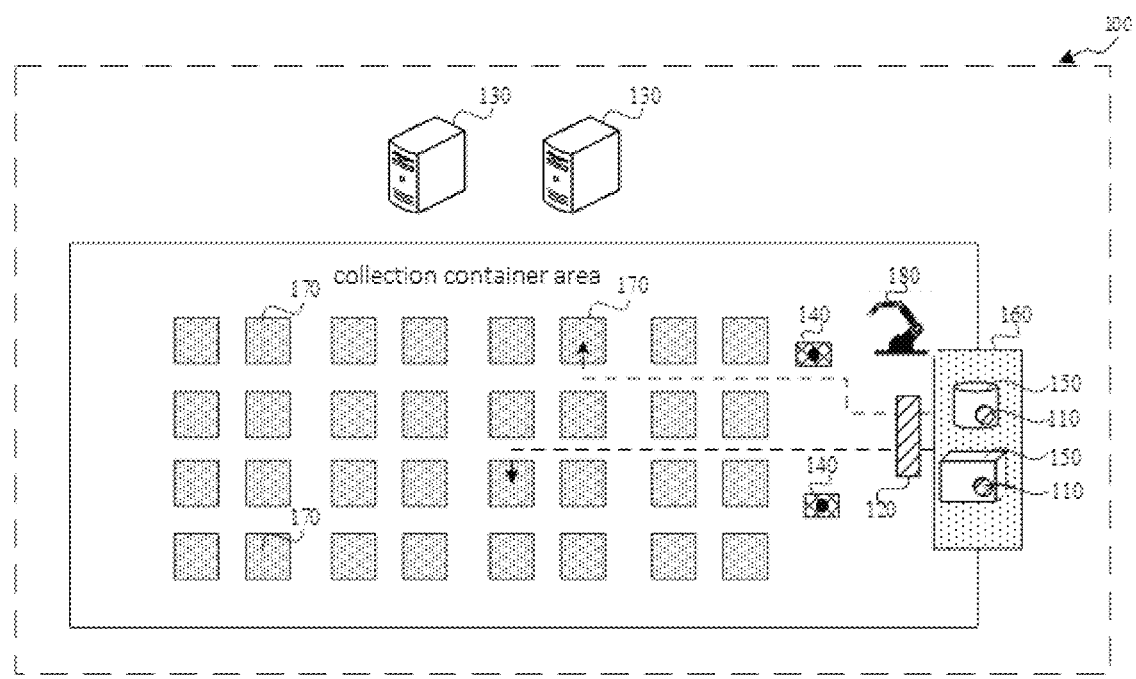
FIG. 1 is a schematic diagram of a sorting system provided in an embodiment of the present disclosure.

FIG. 1 is a schematic diagram of a sorting system provided in an embodiment of the present disclosure. The technical solution of this embodiment can be applied to a case of sorting commodities or packages in a sorting scenario, for example, in a case of realizing sorting of commodities or packages in an unmanned sorting scenario. The sorting system can implement the sorting method provided in any embodiment of the present disclosure. As shown in FIG. 1, the sorting system 100 provided in this embodiment of the present disclosure includes at least one radio frequency tag 110, at least one first radio frequency tag reader 120, at least one control server 130, at least one sorting robot 140, at least one feeding table 160 and at least one collection container 170.

At least one feeding table 160 is configured to be placed with at least one item to be sorted 150. At least one radio frequency tag 110 is configured to be disposed on at least one item to be sorted 150, and tag information of each radio frequency tag 110 includes sorting destination information of the item to be sorted 150 where each radio frequency tag is located.

The first radio frequency tag reader 120 is configured to read tag information in the radio frequency tag 110, and send the read tag information to the control server 130.

The control server 130 is configured to determine the sorting destination of the item to be sorted 150 where each radio frequency tag is located according to the tag information read by the first radio frequency tag reader 120, and determine a target collection container from the at least one collection container 170 according to the sorting destination, and send a delivery instruction to at least one sorting robot 140.

The at least one sorting robot 140 is configured to, in response to the delivery instruction, deliver the at least one item to be sorted 150 obtained from the at least one feeding table 160 to the target collection container.

The working process of the sorting system of this embodiment will be described below with reference to the schematic diagram of the sorting system shown in FIG. 1.

In this embodiment, the sorting system and method of the present disclosure can be applied in a floor-type sorting scenario or a steel platform sorting scenario, and can deliver the items to be sorted in any of the above-mentioned sorting scenarios. In the floor-type sorting scenario, the sorting robot runs on the ground; and in the steel platform sorting scenario, the sorting robot runs on the steel platform structure.

Figure 2:
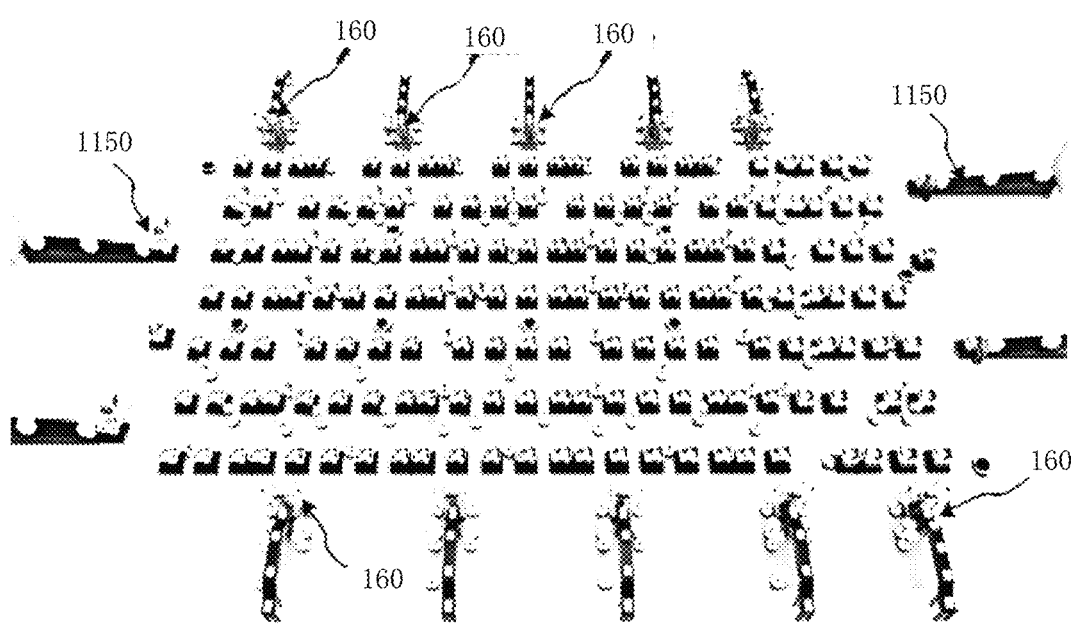
FIG. 2 is a schematic diagram of a floor-type sorting scenario of a sorting system provided in an embodiment of the present disclosure.

In this embodiment, FIG. 2 is a schematic diagram of a floor-type sorting scenario of a sorting system provided in an embodiment of the present disclosure. Referring to FIG. 1 and FIG. 2, a plurality of collection containers 170 are deployed in the middle of the sorting area, and the multiple collection containers 170 are arranged in the sorting area in an array to form a collection container area. For the floor-type sorting scenario, horizontal and vertical gaps between adjacent collection containers 170 constitute walking passage of the sorting robot on the ground. In addition, for the steel platform sorting scenario, each grid opening of the steel platform structure corresponds to a collection container, and horizontal and vertical gaps between adjacent collection containers can ensure the adjacent grid openings on the steel platform remain a certain horizontal gap and vertical gap, so that the horizontal gaps and vertical gaps between the grid openings on the steel platform constitute the walking passage of the sorting robot on the steel platform. It can be understood that, in the steel platform sorting scenario, the sorting robot needs to run on the steel platform, and the steel platform has a certain height, so the sorting robot generally cannot leave the steel platform, and thus the feeding table can be disposed adjacent to one side of the steel platform, which is convenient for the sorting robot to obtain the items to be sorted from the feeding table. In the floor-type sorting scenario, since the sorting robot is driving on the ground, the above problems do not need to be considered.

In this embodiment, referring to FIG. 1, the control server 130 refers to a software and/or hardware system with data information storage and data information processing capabilities, and can communicate with the hardware device or software system in the sorting system in a wired or wireless manner. The control server 130 can be used to implement the control and scheduling of the entire sorting system. Optionally, the control server 130 can receive information sent by multiple hardware devices or software systems in the sorting system, and can also send tasks to multiple hardware devices or software systems in the sorting system to count a sorting situation, detect a working state of the sorting system, pass information to the staff, and issue control instructions to multiple types of robots in the sorting system, etc.

In this embodiment, for each feeding table 160, one or more items to be sorted can be placed on each feeding table 160; and for each item to be sorted placed on the feeding table 160, each item to be sorted 150 carries a uniquely identified radio frequency tag. In one embodiment, the radio frequency tags carried by the items to be sorted 150 are radio frequency identification (RFID) tags. Each radio frequency tag 110 contains preset tag information, and the tag information includes sorting destination information of the item to be sorted. In one embodiment, the sorting destination includes information of a city where a delivery address of the item to be sorted is located, that is, information of the city to be delivered to. For example, the sorting destination information may include identification data for indicating physical locations such as "Tianjin" and "Beijing". In this embodiment, different items to be sorted may need to be sent to different destinations, and at this time, multiple items to be sorted have different sorting destinations. As described above, the sorting destination information of the item to be sorted is carried in the tag information of the radio frequency tag of the item to be sorted. Referring to FIG. 1, one or more first radio frequency tag readers 120 are deployed in the sorting system. When the item to be sorted 150 placed on the feeding table 160 is close to the first radio frequency tag reader 120, the first radio frequency tag reader 120 can scan the radio frequency tag 110 carried on the item to be sorted 150 and read the tag information in the radio frequency tag 110. Moreover, the first radio frequency tag reader 120 establishes a communication connection with the control server 130, and can send the read tag information in the radio frequency tag 110 to the control server 130.

In this embodiment, referring to FIG. 1, the control server 130 can receive the tag information of the radio frequency tag 110 sent by the first radio frequency tag reader 120. Furthermore, the control server 130 can determine the sorting destination of the item to be sorted 150 according to the tag information read by the first radio frequency tag reader 120. For at least one collection container 170 deployed in the sorting area, each collection container 170 corresponds to at least one sorting destination. In other words, each collection container 170 can have a correspondence relationship with one or more sorting destinations. At this time, the control server 130 can determine the collection container corresponding to the sorting destination according to the above-mentioned correspondence relationship, that is, can determine the target collection container from the at least one collection container 170 according to the sorting destination, that is, determine the target collection container in the sorting area to which the item to be sorted on the feeding table 160 needs to be delivered.

In this embodiment, referring to FIG. 1 and FIG. 2, for a plurality of collection containers 170 deployed in the sorting area, the collection containers corresponding to the same sorting destination are arranged adjacent to each other, that is, if two collection containers 170 have the same sorting destination, the two collection containers 170 are arranged adjacent to each other. Optionally, for the multiple collection containers 170 deployed in the sorting area, the multiple collection containers 170 may be divided into at least two collection container groups, and the collection containers 170 corresponding to similar sorting destinations may be deployed in the same collection container group. That is, if two collection containers 170 correspond to similar sorting destinations, the two collection containers 170 can be deployed in the same collection container group. In this embodiment, the same sorting destination means that the sorting destinations are the same in physical location, for example, both are "Tianjin"; and the similar sorting destinations means that the two sorting destinations are physically close to each other, that is, the distance between two sorting destinations is less than a preset threshold, for example, one is "Tianjin" and the other is "Beijing".

In this embodiment, referring to FIG. 1 and FIG. 2, optionally, the same feeding table 160 is associated with a unique collection container group, and at this time, the multiple sorting destinations corresponding to the same feeding table 160 are the same as the sorting destinations corresponding to the plurality of collection containers 170 in the collection container group described above, which can ensure that the items to be sorted on the same feeding table 160 are delivered to the same collection container group. Optionally, the same collection container group can be associated with one or more feeding tables 160 at the same time, which can ensure that multiple feeding tables 160 deliver items to the collection containers 170 in the same collection container group at the same time, which can increase a delivery efficiency in the collection container group, thereby improving the overall delivery efficiency.

In this embodiment, referring to FIG. 1, the control server 130 may generate a delivery instruction for items to be sorted according to the determined target collection container, and send the generated delivery instruction to at least one sorting robot 140 located in the sorting area. Furthermore, the sorting robot 140 can respond to the delivery instruction and deliver at least one item to be sorted 150 obtained from the feeding table 160 to the target collection container. In this way, the collection container 170 can temporarily store the items to be sorted in one or more preset sorting destinations, and can ensure that one or more items to be sorted with sorting destinations that have a correspondence relationship with the collection container 170 are delivered into the collection container 170 for storage.

Optionally, referring to FIG. 1, the sorting area includes a plurality of sorting robots 140 in standby or working state, and the control server 130 may send a delivery instruction for items to be sorted to one target sorting robot of the plurality of sorting robots 140 located in the sorting area. Optionally, when the target sorting robot receives the delivery instruction sent by the control server 130, it can also receive a delivery path of items to be sorted planned according to the position of the target collection container and sent by the control server 130, and deliver at least one item to be sorted 150 obtained from the feeding table 160 according to the delivery path.

On the basis of the above-mentioned embodiment, optionally, referring to FIG. 1, the first radio frequency tag reader 120 is disposed at a preset position of the feeding table 160; or, the first radio frequency tag reader 120 is disposed at a preset position on the sorting robot 140; or, the first radio frequency tag reader 120 is arranged between the feeding table 160 and the at least one collection container 170 and a distance between the first radio frequency tag reader 120 and the preset position of the feeding table 160 is less than a preset value. When at least one item to be sorted 150 obtained from at least one feeding table 160 is assigned to at least one sorting robot 140 in the sorting area, the item to be sorted 150 will pass or approach the position where the first radio frequency tag reader 120 is disposed, such that the first radio frequency tag reader 120 reads the tag information of the radio frequency tag.

The sorting system 100 of this embodiment further includes a first grabbing component 180. The following describes the settings of the first radio frequency tag reader 120 and the first grabbing component 180 through several optional examples.

In an optional example, for the case where the first radio frequency tag reader 120 is disposed at the preset position of the feeding table 160, the first grabbing component 180 is disposed on the feeding table 160, and the first grabbing component 180 can grab items to be sorted 150 from the feeding table 160, and place the grabbed items to be sorted 150 on at least one sorting robot 140 in the sorting area. Optionally, the first radio frequency tag reader 120 is disposed on the first grabbing component 180, and when the first grabbing component 180 grabs the item to be sorted 150 on the feeding table 160, the first radio frequency tag reader 120 reads the tag information in the radio frequency tag 110 of the item to be sorted 150.

In another optional example, for the case where the first radio frequency tag reader 120 is disposed at a preset position on the sorting robot 140, the first grabbing component 180 is disposed on the body of the sorting robot 140, and can move with the sorting robot 140, so that the sorting robot 140 can autonomously grab the items to be sorted 150 on the feeding table 160 and place them in the preset temporary storage place of its own body to temporarily store the grabbed items to be sorted 150. Optionally, when at least one sorting robot 140 grabs the items to be sorted on the feeding table 160, the first radio frequency tag reader 120 disposed on the first grabbing component 180 reads the tag information in the radio frequency tags 110 of the items to be sorted 150.

In yet another optional example, for the case where the first radio frequency tag reader 120 is disposed between the feeding table 160 and the at least one collection container 170 and the distance between the first radio frequency tag reader 120 and the preset position of the feeding table 160 is less than the preset value, when at least one sorting robot 140 in the sorting area obtains the item to be sorted 150 grabbed from the feeding table 160 through the first grabbing component 180, the sorting robot 140 will carry the item to be sorted to approach and pass the first radio frequency tag reader 120 disposed between the feeding table

160 and the at least one collection container 170. At this time, the first radio frequency tag reader 120 reads the tag information in the radio frequency tag 110 of the item to be sorted 150 carried by the sorting robot 140.

Optionally, the first grabbing component 180 may include a robotic arm, and the robotic arm is provided with a robotic gripper or a suction cup, through which the item to be sorted 150 located on the feeding table 160 can be grabbed. It can be understood that the setting positions of the first radio frequency tag reader 120 and the first grabbing component 180 shown in FIG. 1 may deviate from the positions described in the text. For details, please refer to the text description.

On the basis of the above embodiment, optionally, referring to FIG. 1, the sorting robot 140 includes a plurality of delivery mechanisms, and each delivery mechanism can deliver one or more items to be sorted 150 in the same sorting destination. Optionally, through multiple delivery mechanisms provided by itself, the sorting robot 140 can carry the items to be sorted 150 in one or more sorting destinations when delivering the items to be sorted 150. In an optional example, the multiple items to be sorted 150 carried by the sorting robot 140 may have the same sorting destination. In this case, the sorting robot 140 may deliver the carried multiple items to be sorted to the same collection container at the same time according to the same sorting destination. In another optional example, the multiple items to be sorted 150 carried by the sorting robot 140 may have different sorting destinations. In this case, the sorting robot 140 may sequentially deliver the carried multiple items to be sorted 150 having different sorting destinations to different collection containers 170 for storage according to different soring routes.

For the above two optional examples, if the first radio frequency tag reader 120 is disposed on the sorting robot 140, before the sorting robot 140 delivers each item to be sorted 150 carried by itself, the first radio frequency tag reader 120 on the sorting robot 140 reads the tag information in the radio frequency tag 110 of each item to be sorted 150, and sends the read tag information to the control server 130. Furthermore, for the tag information in the radio frequency tag of each item to be sorted 150 read above, the control server 130 determines the sorting destination of the item to be sorted 150 according to the tag information read by the first radio frequency tag reader 120 and determines a target collection container for the item to be sorted from the at least one collection container 170 according to the sorting destination of the item to be sorted, and sends a delivery instruction for the item to be sorted 150 to at least one sorting robot 140. Then, the sorting robot 140 responds to the delivery instruction for the item to be sorted, and delivers at least one item to be sorted obtained from at least one feeding table to the corresponding target collection container, thereby realizing automatic delivery of multiple items to be sorted 150.

In embodiment of the present application, an object being close to another object indicates that a distance between one object and another object is less than a preset value.

According to the sorting solution provided in embodiments of the present disclosure, since the first radio frequency tag reader has no requirement on the reading direction, no matter what attitude the items to be sorted are placed in, the first radio frequency tag reader can read the tag information in the radio frequency tags of the items to be sorted without manual operations, ensuring that the tag information can be automatically identified and sent when the items to be sorted are grabbed from the feeding table, so that the control server can automatically determine the sorting destinations of the grabbed items to be sorted, automatically assign the items to be sorted to the collection containers, and send delivery instructions for the items to be sorted to the sorting robots to instruct the sorting robots to deliver the items to be sorted to the corresponding collection containers, and further the sorting robot can automatically deliver the items to be sorted into the collection containers according to the delivery instructions, thereby realizing the unmanned operation of the delivery process, saving time wasted by manually aligning the barcode of the commodity or package to identify the delivery in the delivery process, improving delivery efficiency and reducing labor costs in the delivery process.

Figure 3:
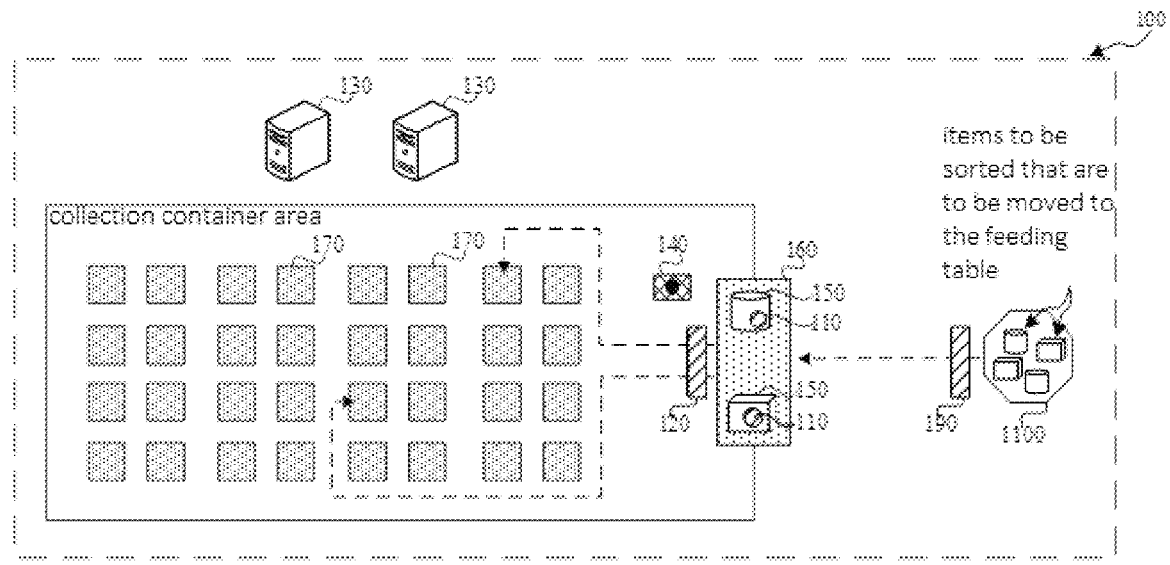
FIG. 3 is a schematic diagram of another sorting system provided in an embodiment of the present disclosure.

FIG. 3 is a schematic diagram of another sorting system provided in an embodiment of the present disclosure, and the present embodiment is described on the basis of the above-mentioned embodiment. This embodiment may be combined with the optional solutions in one or more of the foregoing embodiments. Referring to FIG. 3, based on the above-mentioned embodiments, the sorting system further includes a second radio frequency tag reader 190. The second radio frequency tag reader 190 is close to the location of the items to be sorted that are to be moved to the feeding table 160. Each feeding table 160 corresponds to at least one sorting destination, and each feeding table 160 can allow placing items to be sorted 150 in at least one sorting destination.

The second radio frequency tag reader 190 is configured to read tag information in the radio frequency tag of the item to be sorted that is to be moved to the feeding table 160, and send the read tag information to the control server 130.

The control server 130 is further configured to, determine the sorting destination of the item to be sorted that is to be moved to the feeding table 160 according to the tag information read by the second radio frequency tag reader 190, determine the feeding table 160 corresponding to the item to be sorted that is to be moved to the feeding table from the at least one feeding table 160 according to the sorting destination, so that the item to be sorted that is to be moved to the feeding table is moved to the corresponding feeding table 160.

The specific working process of the sorting system of this embodiment will be described in detail below with reference to the schematic diagram of the sorting system shown in FIG. 3.

In this embodiment, referring to FIG. 3, an unloading area is preset in the sorting area corresponding to the sorting system 100, and a plurality of items to be sorted can be transported to the unloading area by using transport equipment, and unloaded in the unloading area. The items to be sorted in the unloading area may be the items to be sorted that are to be moved to the feeding table, and the items to be sorted in the unloading area need to be moved to the corresponding feeding tables 160. The item to be sorted that is unloaded from the transport equipment carries a uniquely identified radio frequency tag, the radio frequency tag includes corresponding tag information, and the tag information includes the sorting destination information of the item to be sorted. The second radio frequency tag reader 190 may be disposed between the items to be sorted in the unloading area that are to be moved to the feeding table and the position of the feeding table 160. A wired or wireless communication connection can be established between the second radio frequency tag reader 190 and the control server 130, and the second radio frequency tag reader 190 can read the tag information in the radio frequency tags of the items to be sorted unloaded from the transport equipment, and send the read tag information to the control server 130.

In one embodiment, the items to be sorted that are to be moved to the feeding table cannot be placed at will, and one or more item buffer facilities 1100 may be pre-set in the unloading area. The item buffer facility 1100 can receive and buffer the items to be sorted that are transported by the transport equipment and to be moved to the feeding table, and the second radio frequency tag reader 190 can be disposed between the item buffer facility 1100 and the preset position of the feeding table 160. In one embodiment, the item buffer facility 1100 may be a building facility or a large buffer container, or a large container for buffering items to be sorted that are unloaded from the transport equipment.

In this embodiment, referring to FIG. 3, the control server 130 can receive the tag information sent from the second radio frequency tag reader 190, and then can determine the sorting destinations of the items to be sorted that are to be moved to the feeding table according to the tag information sent by the second radio frequency tag reader 190, preliminarily classify the items to be sorted that are to be moved to the feeding table, according to the sorting destinations, and determine a corresponding feeding table for the classified one or more items to be sorted that are to be moved to the feeding table, that is, from the plurality of feeding tables, the corresponding feeding table 160 to which the items to be sorted need to be moved. Optionally, the same feeding table 160 may be associated with items to be sorted in at least one sorting destination, in other words, the feeding table 160 may temporarily store the items to be sorted in one or more sorting destinations, so that it can be ensured that the items to be sorted with the preset destinations will be initially supplied to the same feeding table 160 for centralized temporary storage, so that batch delivery can be performed from the feeding table in the future.

In one embodiment, the tag information in the radio frequency tag read by the first radio frequency tag reader 120 is consistent in content with the tag information in the radio frequency tag read by the second radio frequency tag reader 190, for example, both include the pickup destination of the item to be sorted. The difference between the two is that the functions of the read tag information in the radio frequency tag are different. The tag information read by the first radio frequency tag reader 120 is used for delivery, that is, to determine the collection containers to which the items to be sorted are delivered for storage; the tag information read by the second radio frequency tag reader 190 is used for feeding, that is, to determine the feeding tables to which the items to be sorted that are to be moved for classified storage.

Figure 4:
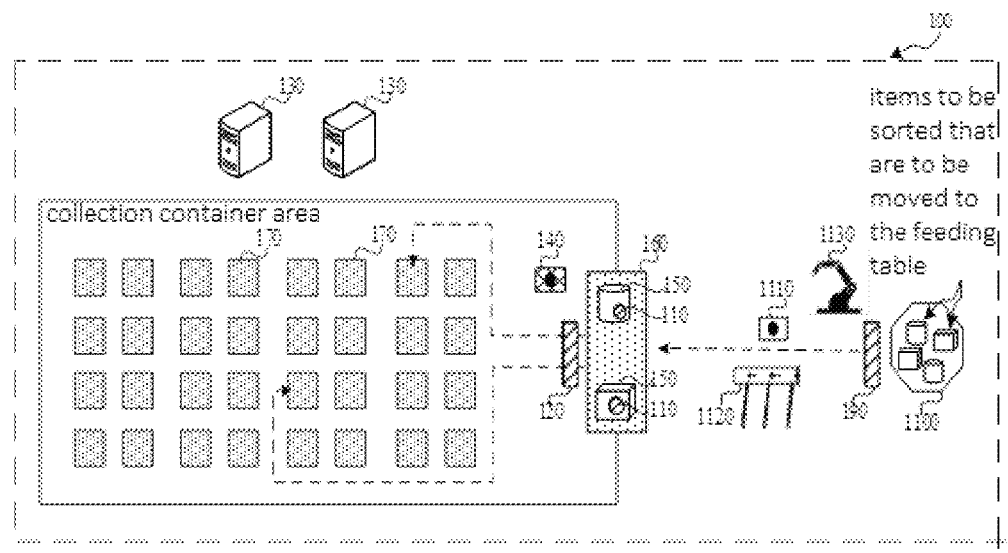
FIG. 4 is a schematic diagram of another sorting system provided in an embodiment of the present disclosure.

In an optional implementation of this embodiment, this implementation may be combined with the optional solutions in one or more of the foregoing embodiments. FIG. 4 is a schematic diagram of another sorting system provided in an embodiment of the present disclosure. Referring to FIG. 4, the sorting system 100 further includes at least one handling robot 1110 or item conveying facility 1120.

The control server 130 sends a feeding instruction to at least one handling robot 1110 or item conveying facility 1120 according to the feeding table 160 corresponding to the items to be sorted that are to be moved to the feeding table.

The handling robot 1110 receives the feeding instruction, and in response to the feeding instruction, moves the items to be sorted that are to be moved to the feeding table, to the corresponding part feeding table 160; or, the item conveying facility 1120 receives the feeding instruction, and in response to the feeding instruction, moves the items to be sorted that are to be moved to the feeding table, to the corresponding feeding table 160.

In this implementation, a plurality of handling robots 1110 are deployed between the unloading area where the items to be sorted are stacked (for example, the position of the item buffer facility 1100) and the feeding table 160; or, one or more item conveying facilities 1120 are are deployed; or, a combination of handling robots 1110 and item conveying facilities 1120 is deployed. After generating the feeding instruction, the control server 130 sends the feeding instruction to at least one of the handling robots 1110 and the item conveying facilities 1120.

Figure 5:
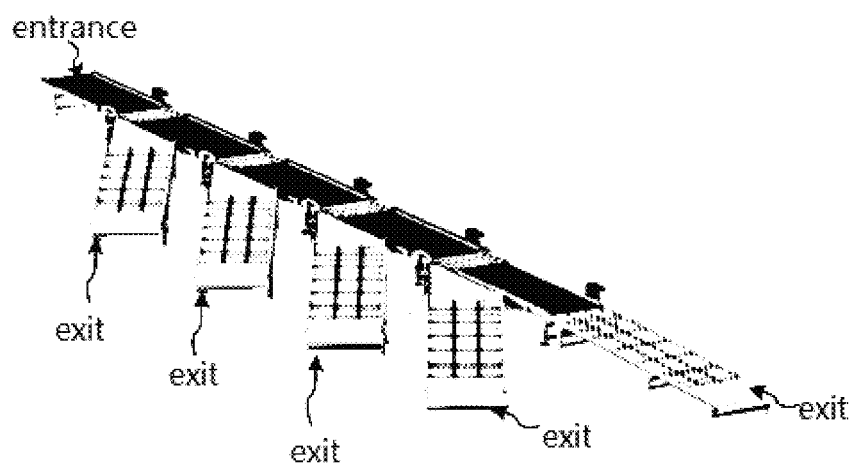
FIG. 5 is a schematic diagram showing a part of an item transfer facility in a sorting system provided in an embodiment of the present disclosure.

In this implementation, in an optional example, referring to FIG. 4, for the handling robot 1110, the handling robot 1110 can transport the items to be sorted buffered in the item buffer facility 1100 to the corresponding feeding table according to the feeding instruction 160 for temporary storage. In another optional example, referring to FIG. 4, for the item conveying facility 1120, the item conveying facility 1120 can receive the feeding instruction sent by the control server 130, and convey the items to be sorted buffered in the item buffer facility 1100 to the corresponding feeding table according to the feeding instruction 160 for temporary storage. FIG. 5 is a schematic diagram showing a part of an item conveying facility in a sorting system provided in an embodiment of the present disclosure. Referring to FIG. 5, the item conveying facility 1120 includes an entrance, a plurality of exits, and a conveying part connecting the entrance and the multiple exits. The item to be sorted can enter the item conveying facility 1120 through the entrance, and is conveyed by the conveying part and comes out of the item conveying facility 1120 from one of the multiple exits. There is a preset correspondence relationship between the multiple exits and the multiple feeding tables 160. The item conveying facility 1120 guides the item to be sorted to a target exit corresponding to the corresponding feeding table 160 according to the feeding instruction, so as to convey the item to be sorted to the corresponding feeding table 160.

In an optional implementation of this embodiment, this embodiment may be combined with the optional solutions in one or more of the foregoing embodiments. Referring to FIG. 4, the sorting system further includes a second grabbing component 1130. The second grabbing component 1130 is configured to grab the item to be sorted that is located in the unloading area and to be moved to the feeding table, and place the grabbed item to be sorted on the handling robot 1110 or the item conveying facility 1120, so that the handling robot 1110 or the item conveying facility 1120 supplies the item to be sorted to the corresponding feeding table 160. In one embodiment, the second grabbing component 1130 may include a robotic arm, and a robotic gripper or a suction cup is provided on the robotic arm, and the items to be sorted may be grabbed by the robotic gripper or the suction cup.

In this implementation, in an optional example, referring to FIG. 4, the second radio frequency tag reader 190 is disposed on the second grabbing component 1130. When the second grabbing component 1130 grabs the item to be sorted that is to be moved to the feeding table from the item buffer facility 1100, the second radio frequency tag reader 190 directly reads tag information in the radio frequency tag of the grabbed item to be sorted and send the read tag information in the radio frequency tag of the item to be sorted to the control server 130. In another optional example, referring to FIG. 4, the second radio frequency tag reader 190 is disposed on the handling robot 1110 or the item conveying facility 1120. When the second grabbing component 1130 grabs the item to be sorted that is to be moved to the feeding table from the item buffer facility 1100 and places the grabbed item to be sorted on the handling robot 1110 or the item conveying facility 1120, the second radio frequency tag reader 190 located on the handling robot 1110 or the item conveying facility 1120 directly reads the tag information in the radio frequency tag of the grabbed item to be sorted, and sends the read tag information in the radio frequency tag of the item to be sorted to the control server 130.

In this embodiment, the setting position of the second radio frequency tag reader shown in FIG. 3 may deviate, and the setting positions of the second radio frequency tag reader and the second grabbing component shown in FIG. 4 may deviate from the positions described in text. For specific settings, please refer to the text descriptions for FIG. 3 and FIG. 4.

According to the sorting solution provided in embodiments of the present disclosure, the tag information in the radio frequency tags of the items to be sorted that are to be moved to the feeding table is automatically read by the second radio frequency tag reader, and the control server automatically instructs supplying the items to be sorted to the matching feeding table for buffering according to the tag information read by the second radio frequency tag reader. With the solution of this embodiment, since the radio frequency reader has no requirement on the reading direction, no matter in what posture the items to be sorted are placed, the second radio frequency tag reader can read the tag information in the radio frequency tags of the items to be sorted without manual operation, so as to ensure that the tag information are automatically recognized and sent when the items to be sorted are grabbed. In this way, the control server can determine the sorting destination of the grabbed item to be sorted in advance, and automatically supply the item to be sorted to the corresponding feeding table, so as to realize the unmanned operation of the feeding process, which saves the time wasted by manually aligning the barcodes of commodities or packages in the feeding link to identify the barcodes of the commodities or packages, improves the feeding efficiency and reduces the labor cost in the feeding link.

Figure 6:
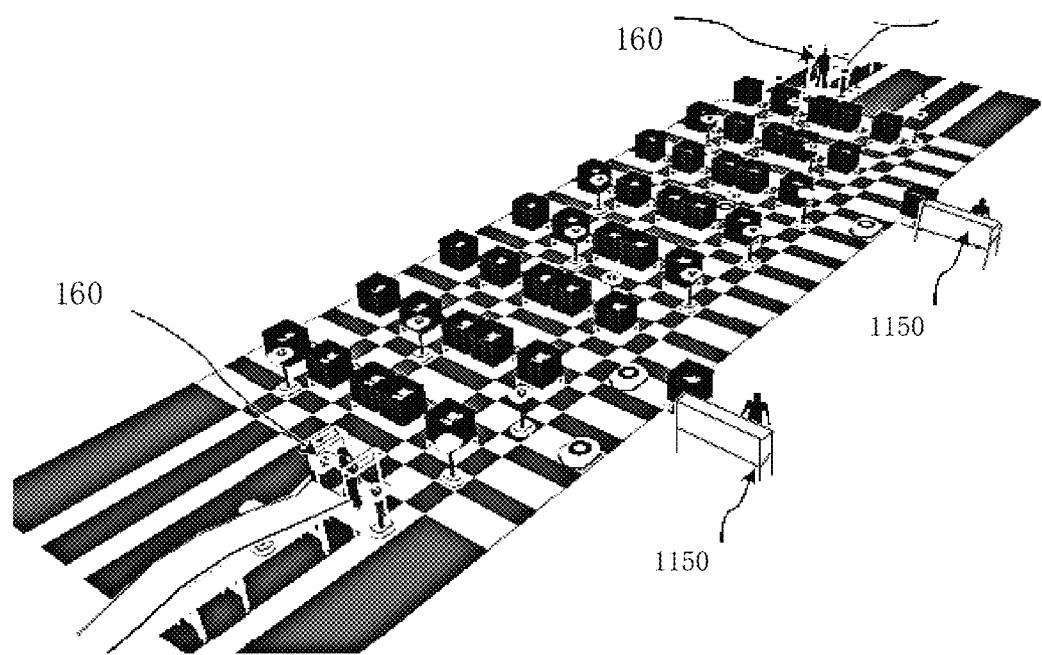
FIG. 6 is a schematic diagram showing a part of floor-type sorting scenario including a collection table provided in an embodiment of the present disclosure.

FIG. 6 is a schematic diagram showing a part of a floor-type sorting scenario including a collection table provided in an embodiment of the present disclosure. Referring to FIG. 6, in the traditional way, the collection table requires a staff to check the items to be sorted in the collection container. On the basis of the foregoing embodiments, this implementation may be combined with optional solutions in one or more of the foregoing embodiments. FIG. 7 is a schematic diagram of another sorting system provided in an embodiment of the present disclosure. Referring to FIG. 7, the sorting system 100 further includes at least one third radio frequency tag reader 1140 and at least one collection table 1150. The third radio frequency tag reader 1140 is disposed at a preset position of the collection table 1150.

The third radio frequency tag reader 1140 is configured so that when the collection container 170 containing the items to be sorted is close to the third radio frequency tag reader 1140, the third radio frequency tag reader 1140 reads the tag information of the radio frequency tags of all the items to be sorted in the collection container 170, and send the read tag information of all the radio frequency tags to the control server 130.

The control server 130 is further configured to determine whether all the items to be sorted 150 meet a sorting condition according to the tag information of all the radio frequency tags, and instruct handling the collection container 170 containing the items to be sorted to the collection table 1150 when determining that the items to be sorted 150 meet the sorting condition.

In this embodiment, referring to FIG. 7, the third radio frequency tag reader 1140 is disposed at a preset position between the collection table 1150 and the plurality of collection containers 170 to ensure that the collection container 170 containing the items to be sorted will first pass the third radio frequency tag reader 1140 and then reach the collection table 1150. In this way, when the collection container 170 containing the items to be sorted passes the third radio frequency tag reader 1140, the third radio frequency tag reader 1140 reads the tag information of all the radio frequency tags in the collection container 170. Optionally, the third radio frequency tag reader 1140 is an RFID identification gate. When the collection container 170 containing the items to be sorted passes through the RFID identification gate, the RFID identification gate will automatically read the tag information of all the radio frequency tags in the collection container 170, and send the tag information of all radio frequency tags to the control server 130.

In this embodiment, there may be deviations in the setting position of the third radio frequency tag reader 1140 shown in FIG. 7. For the setting situation of the third radio frequency tag reader 1140, please refer to the text description for FIG. 7.

In this embodiment, the control server 130 determines whether the sorting destination of each item to be sorted contained in the collection container 170 matches the sorting destination of the current collection container according to the tag information of all the radio frequency tags, and determines whether the number of items to be sorted in the collection container 170 is correct, and determines whether the sorting condition is met in combination with the above aspects. If it is determined that the items to be sorted meet the sorting condition, the sorting robot is instructed to handle the collection container containing the items to be sorted to the collection table 1150, so as to be packed and loaded, that is, the sorting can be completed. If it is determined that the items to be sorted do not meet the sorting condition, it indicates that multiple items to be sorted in the collection container 170 do not meet the sorting requirements, and at this time, the collection container 170 containing the items to be sorted is transferred and exception handling is performed. By adopting the above method, there is no need to manually review the items to be sorted in the collection container 170 at the collection table 1150, and the review work can be automatically completed when the collection container 170 reaches the collection table 1150, thereby speeding up the collection efficiency, further improving the sorting efficiency of the entire sorting process, and reducing the labor cost of the collection link, thereby reducing the labor cost of the entire sorting process.

FIG. 8 is a flowchart of a sorting method provided in an embodiment of the present disclosure. The technical solution of the present embodiment can be applied to the unmanned sorting of commodities or packages, and the method can be applied to an unmanned sorting system provided in any embodiment of the present disclosure. As shown in FIG. 7, the sorting method in the embodiment of the present disclosure includes the following steps.

At S810, the first radio frequency tag reader reads the tag information of each radio frequency tag in at least one radio frequency tag, and sends the read tag information to the control server. The at least one radio frequency tag is respectively configured on at least one item to be sorted placed on at least one feeding table, and the tag information of each radio frequency tag includes sorting destination information of the item to be sorted where each radio frequency tag is located.

Based on the technical solutions of the above embodiments, optionally, the first radio frequency tag reader is disposed at a preset position of the feeding table; or, the first radio frequency tag reader is disposed at a preset position of the sorting robot; or, the first radio frequency tag reader is disposed between the feeding table and the at least one container, and the distance between the first radio frequency tag reader and the preset position of the feeding table is less than the preset value.

On the basis of the technical solutions of the foregoing embodiments, optionally, the method further includes followings.

The first grabbing component grabs the items to be sorted from the feeding table, and places the grabbed items to be sorted on the at least one sorting robot, wherein, the first grabbing component is disposed on the feeding table. In the case where the first radio frequency tag reader is disposed at a preset position of the feeding table, the first radio frequency tag reader is disposed on the first grabbing component.

Based on the technical solutions of the foregoing embodiments, optionally, the at least one sorting robot includes a plurality of delivery mechanisms, and the delivery mechanisms are configured to deliver at least one item to be sorted on the sorting robot.

At S820, the control server determines the sorting destination of the item to be sorted where each radio frequency tag is located according to the tag information read by the first radio frequency tag reader, and determine a target collection container from at least one collection container according to the sorting destination, and sends a delivery instruction to at least one sorting robot.

At S830, in response to the delivery instruction, the at least one sorting robot delivers each item to be sorted where each radio frequency tag is located, obtained from the at least one feeding table, to a corresponding target collection container.

Based on the technical solutions of the above embodiments, optionally, in response to the delivery instruction, the at least one sorting robot delivers at least one item to be sorted where each radio frequency tag is located, obtained from the at least one feeding table, to the target collection container as follows. The at least one sorting robot, in response to the delivery instruction, delivers the items to be sorted where each radio frequency tag is located, obtained from the at least one feeding table, to the target collection container through the delivery mechanisms of the at least one sorting robot.

On the basis of the technical solutions of the above embodiments, optionally, each collection container corresponds to at least one sorting destination, and collection containers corresponding to the same sorting destination are arranged adjacent to each other; the at least one feeding table corresponds to at least one sorting destination.

On the basis of the technical solutions of the foregoing embodiments, optionally, the sorting method further includes:
  reading, by the second radio frequency tag reader, the tag information in the radio frequency tags of the items to be sorted that are to be moved to the feeding table, and sending the read tag information to the control server;
  determining, by the control server, the sorting destination of the item to be sorted that is to be moved to the feeding table according to the tag information read by the second radio frequency tag reader, and determining the feeding table corresponding to the item to be sorted that is to be moved to the feeding table, from the at least one feeding table according to the sorting destination, so that the item to be sorted that is to be moved to the feeding table is moved to the corresponding feeding table.

On the basis of the technical solutions of the foregoing embodiments, optionally, the sorting method further includes:
  sending, by the control server, a feeding instruction to at least one handling robot or at least one item conveying facility according to the corresponding feeding table of the item to be sorted that is to be moved to the feeding table;
  receiving, by the handling robot, the feeding instruction, and moving the item to be sorted that is to be moved to the feeding table, to the corresponding feeding table in response to the feeding instruction; or,
  receiving, by the item conveying facility, the feeding instruction, and moving the item to be sorted that is to be moved to the feeding table, to the corresponding feeding table in response to the feeding instruction.

On the basis of the technical solutions of the foregoing embodiments, optionally, the sorting method further includes:
  grabbing, by the second grabbing component, the item to be sorted that is to be moved to the feeding table, and placing the grabbed item to be sorted on the handling robot or the item conveying facility.

On the basis of the technical solutions of the above embodiments, optionally, the second radio frequency tag reader is disposed on the second grabbing component.

On the basis of the technical solutions of the foregoing embodiments, optionally, the second radio frequency tag reader is disposed on the handling robot or the item conveying facility.

On the basis of the technical solutions of the above-mentioned embodiments, optionally, the sorting method further includes: receiving, by the item buffer facility, the items to be sorted that are transported by the transport equipment and are to be moved to the feeding table, and buffering the items to be sorted that are to be moved to feeding table, wherein the second radio frequency tag reader is disposed at a preset position between the item buffer facility and the feeding table.

On the basis of the technical solutions of the foregoing embodiments, optionally, the sorting method further includes:
  in the case where the distance between the collection container containing the items to be sorted and the third radio frequency tag reader is less than the preset distance threshold, reading by the third radio frequency tag reader, the tag information of all radio frequency tags in the collection container, and sending the tag information of all the radio frequency tags to the control server; wherein, the third radio frequency tag reader is disposed at the preset position of the collection table;
  determining, by the control server, whether all the items to be sorted meet the sorting condition according to the tag information of all the radio frequency tags; and, in the case where it is determined that all the items to be sorted meet the sorting condition, instructing the handling robot to handle the collection container containing the items to be sorted to collection table.

Based on the technical solutions of the foregoing embodiments, optionally, the sorting condition include at least one of the following: whether the sorting destination of the items to be sorted contained in the collection container matches the sorting destination of the collection container; and whether the number of items to be sorted contained in the collection container is correct.

The sorting method provided in embodiments of the present disclosure can be applied to the sorting system provided in any of the above embodiments of the present disclosure, and has the corresponding functions of the sorting system. For the technical details not described in detail in the above embodiments, please refer to the sorting system provided in any of the embodiments of this disclosure.

What is claimed is:

1. A sorting system, comprising a first radio frequency tag reader, a control server, at least one sorting robot, at least one feeding table, at least one collection container, at least one handling robot or at least one item conveying facility, an item buffer facility, and a collection table, wherein:
   the at least one item handling robot or the at least one item conveying facility is configured to move at least one item to be sorted and buffered in the item buffer facility to the feeding table;
   the feeding table is configured to place the at least one item to be sorted; the at least one item to be sorted is provided with a radio frequency tag, and tag information of each radio frequency tag comprises sorting destination information of the corresponding item to be sorted;
   the first radio frequency tag reader is configured to read tag information in a radio frequency tag, and send the read tag information to the control server;
   the control server is configured to determine a sorting destination of the at least one item to be sorted according to the read tag information comprising the sorting destination information, determine a target collection container corresponding to the at least one item to be sorted from the at least one collection container according to the sorting destination, determine a delivery path of the item to be sorted according to a position of the target collection container, and send a delivery instruction and the delivery path of the item to be sorted to a sorting robot;
   the sorting robot is configured to, in response to the delivery instruction received from the control server, deliver the item to be sorted from the feeding table to the target collection container along the delivery path of the item to be sorted, wherein the sorting robot carries at least one delivery mechanism, the at least one delivery mechanism is configured to carry the at least one item to be sorted and deliver the at least one item to be sorted on the sorting robot, each item to be sorted corresponds to a sorting destination, the sorting robot delivers each item to be sorted to the collection container for storage along the delivery path of the item to be sorted according to the sorting destination of the item to be sorted; and
   the control server is further configured to instruct the sorting robot to handle the collection container containing items to be sorted to the collection table in the case that all the items to be sorted contained in the collection container meet a sorting condition.

2. The system of claim 1, wherein the first radio frequency tag reader is disposed at a preset position of the feeding table; or, the first radio frequency tag reader is disposed at a preset position of the sorting robot; or, the first radio frequency tag reader is disposed between the feeding table and the at least one collection container and a distance between the first radio frequency tag reader and a preset position of the feeding table is less than a preset value.

3. The system of claim 2, further comprising a first grabbing component disposed on the feeding table, the first grabbing component being configured to grab at least one item to be sorted on the feeding table, and place the grabbed at least one item to be sorted on the at least one sorting robot; and
   in a case where the first radio frequency tag reader is disposed at the preset position of the feeding table, the first radio frequency tag reader is disposed on the first grabbing component.

4. The system of claim 1, wherein each collection container corresponds to at least one sorting destination, and the collection containers corresponding to the same sorting destination are arranged adjacent to each other; the at least one feeding table corresponds to at least one sorting destination respectively.

5. The system of claim 4, further comprising a second radio frequency tag reader;
   the second radio frequency tag reader is configured to read the tag information in the radio frequency tag of the item to be sorted that is to be moved to the feeding table, and send the read tag information to the control server; and
   the control server is further configured to determine the sorting destination of the item to be sorted that is to be moved to the feeding table according to the read tag information comprising the sorting destination information, and determine the feeding table corresponding to the item to be sorted that is to be moved to the feeding table, from the at least one feeding table according to the sorting destination, so that the item to be sorted that is to be moved to the feeding table is moved to the corresponding feeding table.

6. The system of claim 5, wherein:
   the control server is further configured to send a feeding instruction to a handling robot or a conveying facility according to the feeding table corresponding to the item to be sorted that is to be moved to the feeding table; and
   the handling robot is configured to receive the feeding instruction, and in response to the feeding instruction, move the item to be sorted that is to be moved to the feeding table to the corresponding feeding table; or,
   the item conveying facility is configured to receive the feeding instruction, and in response to the feeding instruction, move the item to be sorted that is to be moved to the feeding table to the corresponding feeding table.

7. The system of claim 6, further comprising a second grabbing component, the second grabbing component being configured to grab the item to be sorted that is to be moved to the feeding table, and place the grabbed item to be sorted on the handling robot or the item conveying facility.

8. The system of claim 7, wherein the second radio frequency tag reader is disposed on the second grabbing component, or disposed on the handling robot or the item conveying facility.

9. The system of claim 7, wherein the item buffer facility is configured to receive the item to be sorted that is transported by a transport equipment and is to be moved to the feeding table, and buffer the item to be sorted that is to be moved to the feeding table, in which the second radio frequency tag reader is disposed at a preset position between the item buffer facility and the feeding table.

10. The system of claim 1, further comprising a third radio frequency tag reader; wherein the third radio frequency tag reader is disposed at a preset position of the collection table;

the third radio frequency tag reader is configured to, in a case where a distance between the collection container containing the items to be sorted and the third radio frequency tag reader is less than a preset distance threshold, read tag information of all radio frequency tags in the collection container, and send the tag information of all radio frequency tags to the control server; and the control server is further configured to determine whether all the items to be sorted in the collection container meet the sorting condition according to the tag information of all the radio frequency tags, and instruct handling the collection container containing the items to be sorted to the collection table in a case of determining all the items to be sorted meet the sorting condition.

11. The system of claim 10, wherein the sorting condition comprises at least one of following: whether the sorting destination of each item to be sorted contained in the collection container matches the sorting destination of the collection container, and whether the number of items to be sorted contained in the collection container is correct.

12. The system of claim 1, wherein the at least one item to be sorted comprises at one of following:
at least one item to be sorted belonging to at least one kind of commodity; or
at least one item to be sorted belonging to a same kind of commodity.

13. A sorting method, comprising:
moving, by at least one item handling robot or at least one item conveying facility, at least one item to be sorted and buffered in an item buffer facility to at least one feeding table;
reading, by a first radio frequency tag reader, tag information of at least one radio frequency tag, and sending the read tag information to a control server, wherein the at least one radio frequency tag is respectively configured on the at least one item to be sorted placed on the at least one feeding table, the tag information of each radio frequency tag comprises sorting destination information of the item to be sorted where each radio frequency tag is located;
determining, by the control server, a sorting destination of the item to be sorted where each radio frequency tag is located according to the tag information read by the first radio frequency tag reader comprising the sorting destination information, determining a target collection container from at least one collection container according to the sorting destination, determining a delivery path of the item to be sorted according to a position of the target collection container, and sending a delivery instruction and the delivery path of the item to be sorted to at least one sorting robot;
in response to the delivery instruction, delivering, by the at least one sorting robot, each item to be sorted from the feeding table to a corresponding target collection container along the delivery path of the item to be sorted, wherein the sorting robot carries at least one delivery mechanism, the at least one delivery mechanism is configured to carry the at least one item to be sorted and deliver the at least one item to be sorted on the sorting robot, each item to be sorted corresponds to a sorting destination, the sorting robot delivers each item to be sorted to the collection container for storage along the delivery path of the item to be sorted according to the sorting destination of the item to be sorted; and instructing, by the control server, the sorting robot to handle the collection container containing items to be sorted to the collection table in a case that all the items to be sorted contained in the collection container meet a sorting condition.

14. The method of claim 13, further comprising:
grabbing, by a first grabbing component, the items to be sorted from the feeding table, and placing the grabbed items to be sorted on the at least one sorting robot; wherein, the first grabbing component is disposed on the feeding table; in a case where the first radio frequency tag reader is disposed at a preset position of the feeding table, the first radio frequency tag reader is disposed on the first grabbing component.

15. The method of claim 13, wherein moving, by the at least one item handling robot or the at least one item conveying facility, the at least one item to be sorted and buffered in the item buffer facility to the at least one feeding table comprises:
reading, by a second radio frequency tag reader, the tag information in the radio frequency tags of the items to be sorted that are to be moved to the feeding table, and sending the read tag information to the control server; and
determining, by the control server, the sorting destination of the item to be sorted that is to be moved to the feeding table according to the tag information read by the second radio frequency tag reader, and determining the feeding table corresponding to the item to be sorted that is to be moved to the feeding table, from the at least one feeding table according to the sorting destination, so that the item to be sorted that is to be moved to the feeding table is moved to a corresponding feeding table.

16. The method of claim 15, further comprising:
sending, by the control server, a feeding instruction to the at least one handling robot or the at least one item conveying facility according to the corresponding feeding table of the item to be sorted that is to be moved to the feeding table; and
receiving, by the handling robot, the feeding instruction, and moving the item to be sorted that is to be moved to the feeding table, to the corresponding feeding table in response to the feeding instruction; or,
receiving, by the item conveying facility, the feeding instruction, and moving the item to be sorted that is to be moved to the feeding table, to the corresponding feeding table in response to the feeding instruction.

17. The method of claim 16, further comprising:
grabbing, by a second grabbing component, the item to be sorted that is to be moved to the feeding table, and placing the grabbed item to be sorted on the handling robot or the item conveying facility.

18. The method of claim 17, further comprising: receiving, by the item buffer facility, the items to be sorted that are transported by a transport equipment and are to be moved to the feeding table, and buffering the items to be sorted that are to be moved to feeding table, wherein the second radio frequency tag reader is disposed at a preset position between the item buffer facility and the feeding table.

19. The method of claim 13, wherein instructing, by the control server, handling the collection container containing items to be sorted to the collection table in a case that all the items to be sorted contained in the collection container meet the sorting condition comprises:
- in a case where a distance between the collection container containing the items to be sorted and a third radio frequency tag reader is less than a preset distance threshold, reading by the third radio frequency tag reader, the tag information of all radio frequency tags in the collection container, and sending the tag information of all the radio frequency tags to the control server; wherein, the third radio frequency tag reader is disposed at a preset position of the collection table; and
- determining, by the control server, whether all the items to be sorted meet the sorting condition according to the tag information of all the radio frequency tags; and, in a case of determining that all the items to be sorted meet the sorting condition, instructing handling the collection container containing the items to be sorted to collection table.

* * * * *